US009032931B2

(12) United States Patent
De Almeida et al.

(10) Patent No.: US 9,032,931 B2
(45) Date of Patent: May 19, 2015

(54) EXHAUST GAS RECIRCULATION (EGR) APPARATUS

(75) Inventors: Eduardo De Almeida, Stamford (GB); Tim Eynon, Cambridgeshire (GB)

(73) Assignee: Perkins Engines Company Limited, Peterborough (GB)

( * ) Notice: Subject to any disclaimer, the term of this patent is extended or adjusted under 35 U.S.C. 154(b) by 709 days.

(21) Appl. No.: 13/194,251

(22) Filed: Jul. 29, 2011

(65) Prior Publication Data

US 2012/0024268 A1 Feb. 2, 2012

(30) Foreign Application Priority Data

Jul. 30, 2010 (EP) .................................... 10171495

(51) Int. Cl.
*F02D 9/06* (2006.01)
*F02D 9/10* (2006.01)
*F02M 25/07* (2006.01)

(52) U.S. Cl.
CPC .......... *F02D 9/1055* (2013.01); *F02M 25/0701* (2013.01); *F02M 25/079* (2013.01); *F02M 25/0793* (2013.01); *Y02T 10/121* (2013.01)

(58) Field of Classification Search
CPC .......... F02D 9/101; F02D 9/1005; F02D 9/04
USPC .................................. 123/323, 337, 336, 403
See application file for complete search history.

(56) References Cited

U.S. PATENT DOCUMENTS

| | | | |
|---|---|---|---|
| 4,142,491 A | 3/1979 | Hibino et al. | |
| 4,375,800 A | 3/1983 | Otsuka et al. | |
| 4,378,776 A | 4/1983 | Nishimori | |
| 4,665,882 A | 5/1987 | Otobe | |
| 4,690,119 A | 9/1987 | Makino et al. | |
| 5,341,300 A | 8/1994 | Fujimoto | |
| 5,429,090 A | 7/1995 | Kotchi et al. | |
| 5,492,097 A | 2/1996 | Byram et al. | |
| 5,542,388 A * | 8/1996 | Ichinose et al. | 123/336 |
| 5,749,350 A | 5/1998 | Bender | |
| 6,070,852 A | 6/2000 | McDonnell et al. | |
| 6,467,257 B1 | 10/2002 | Khair et al. | |
| 7,252,618 B2 | 8/2007 | Spakowski et al. | |
| 7,658,177 B2 | 2/2010 | Baasch et al. | |
| 2005/0183695 A1 | 8/2005 | Keefover et al. | |

FOREIGN PATENT DOCUMENTS

| | | |
|---|---|---|
| DE | 2703687 A1 | 8/1978 |
| DE | 19851677 C1 | 3/2000 |
| EP | 1426589 A2 | 6/2004 |
| WO | 2007063221 A1 | 6/2007 |
| WO | 2009/127929 | 10/2009 |

* cited by examiner

*Primary Examiner* — John Kwon

(57) ABSTRACT

An Exhaust Gas Recirculation (EGR) apparatus for recirculating engine exhaust gas comprising a valve member disposed in an exhaust gas recirculation passage of an engine, the valve member movable between an open position and a closed position to control the flow of the exhaust gas through the exhaust gas recirculation passage, one or more bleeders to enable flow of exhaust gas through the exhaust gas recirculation passage when the valve member is in the closed position.

8 Claims, 5 Drawing Sheets

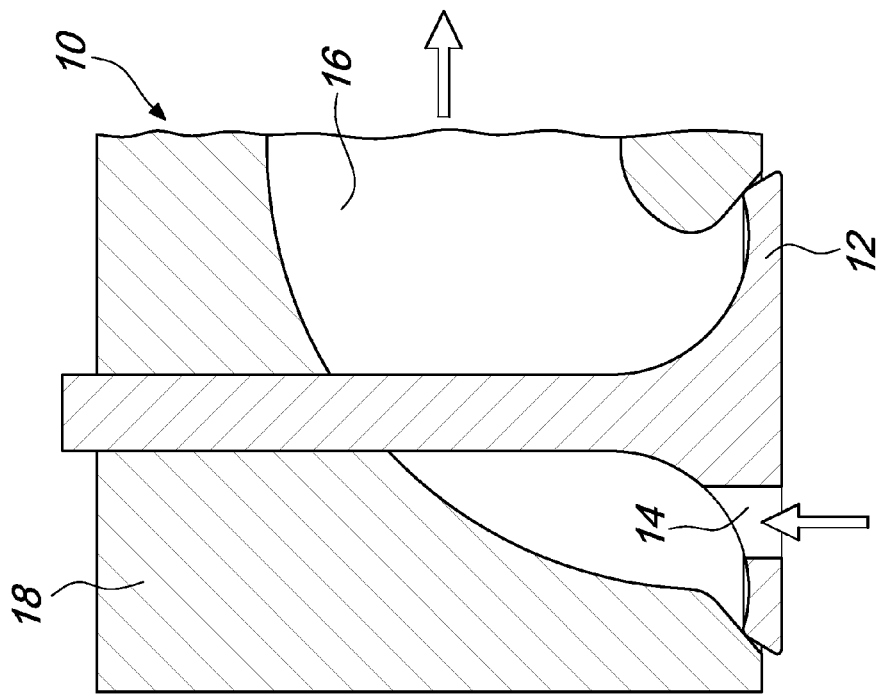
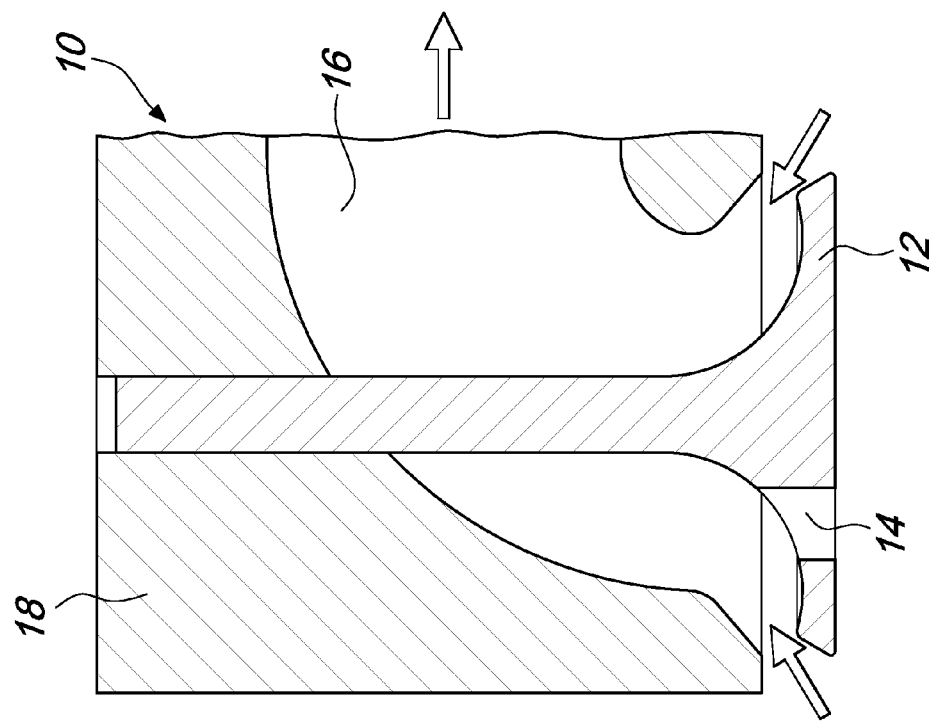

EXHAUST GAS RECIRCULATION (EGR) APPARATUS

RELATION TO OTHER PATENT APPLICATION

This application claims priority to European patent application 10171495.4 filed Jul. 30, 2010 with the same title.

TECHNICAL FIELD

This disclosure relates to exhaust gas recirculation systems in internal gas combustion engines. More particularly, this disclosure relates to an exhaust gas recirculation apparatus for control of exhaust gas flow in exhaust gas recirculation systems.

BACKGROUND

Exhaust Gas Recirculation (EGR) systems may be provided in vehicles for the purpose of reducing nitrogen oxides (NOx) contained in exhaust gas discharged from the combustion chambers of internal combustion engines. A portion of the exhaust gas discharged from the combustion chambers may be recirculated through an exhaust recirculation passage to an intake passage and back to the engine cylinders. The recirculation of the exhaust gas may inhibit the formation of NOx by mixing with the air-fuel mixture in the engine cylinders to lower the combustion temperature.

However, as the combustibility of the air-fuel mixture in the combustion chamber decreases with the presence of the recirculated exhaust gas, there may be a corresponding decrease in engine output and engine operability. Hence, it may be necessary to regulate the flow rate of the recirculated exhaust gas to the intake passage according to the operation of the engine. An EGR valve may be provided in the EGR system to control and time the flow of the recirculated exhaust gas.

During operation of an engine the EGR valve may malfunction and fail in a single position, due to any number of causes. Such failure may incapacitate the valve to regulate the flow of recirculated exhaust gas leading to engine problems.

If the EGR valve malfunctions and fails in a fully open state, an excessive amount of the recirculated exhaust gas may be supplied to the engine which may affect a combustion state of the engine. Thus, the engine operation may be destabilized.

WO2009127929 discloses an internal combustion engine with separate cylinder banks Separate exhaust passages may be connected to each cylinder bank. A shared intake passage may be connected to both cylinder banks, with an end of the EGR passage being connected to the exhaust passage of one cylinder bank, and the other end of the EGR passage being connected to the shared intake passage. If it is determined that an EGR valve in the EGR passage is stuck in an open state, a fuel-cut control may be executed in that cylinder bank that is connected to the separate exhaust passage to which the EGR passage is connected. Thus, even when the EGR valve fails in an open state, it may possible to prevent the internal combustion engine from operating unstably.

U.S. Pat. No. 4,378,776 discloses means for closing a recirculation passage for preventing excessive amount of exhaust gas recirculation. A device may be provided for closing the EGR valve when the actual valve position does not conform with the desired position for a predetermined time. A spring may be provided which forces the EGR valve to the closed position.

However, EGR valves which fail in the fully closed position may result in related problems such as turbo overspeed and NOx non compliance. The present disclosure is directed, at least in part, to improving or overcoming one or more aspects of the prior art EGR valves.

SUMMARY

In a first aspect, the present disclosure describes an Exhaust Gas Recirculation (EGR) apparatus for recirculating engine exhaust gas comprising a valve member disposed in an exhaust gas recirculation passage of an engine, the valve member movable between an open position and a closed position to control the flow of the exhaust gas through the exhaust gas recirculation passage, and one or more bleeders to enable flow of exhaust gas through the exhaust gas recirculation passage when the valve member is in the closed position.

In a second aspect, the present disclosure describes a method of assembling an Exhaust Gas Recirculation (EGR) apparatus comprising the steps of providing a valve member in an exhaust gas recirculation passage of an engine, the valve member movable between an open position and a closed position to control the flow of the exhaust gas through the exhaust gas recirculation passage and forming one or more bleeders to enable flow of exhaust gas through the exhaust gas recirculation passage when the valve member is in the closed position.

Other features and advantages of the present disclosure will be apparent from the following description of various embodiments, when read together with the accompanying drawings.

BRIEF DESCRIPTION OF THE DRAWINGS

The foregoing and other features and advantages of the present disclosure will be more fully understood from the following description of various embodiments, when read together with the accompanying drawings, in which:

FIG. 3 is a schematic cross-section view of a second embodiment of the EGR apparatus having a poppet-type valve member in an open position and a bleeder in the valve member with arrows indicating flow of the exhaust gas;

FIG. 4 is a schematic cross-section view of a second embodiment of the EGR apparatus having a poppet-type valve member in a closed position and a bleeder in the valve member with arrows indicating flow of the exhaust gas;

DETAILED DESCRIPTION

Figure 2:
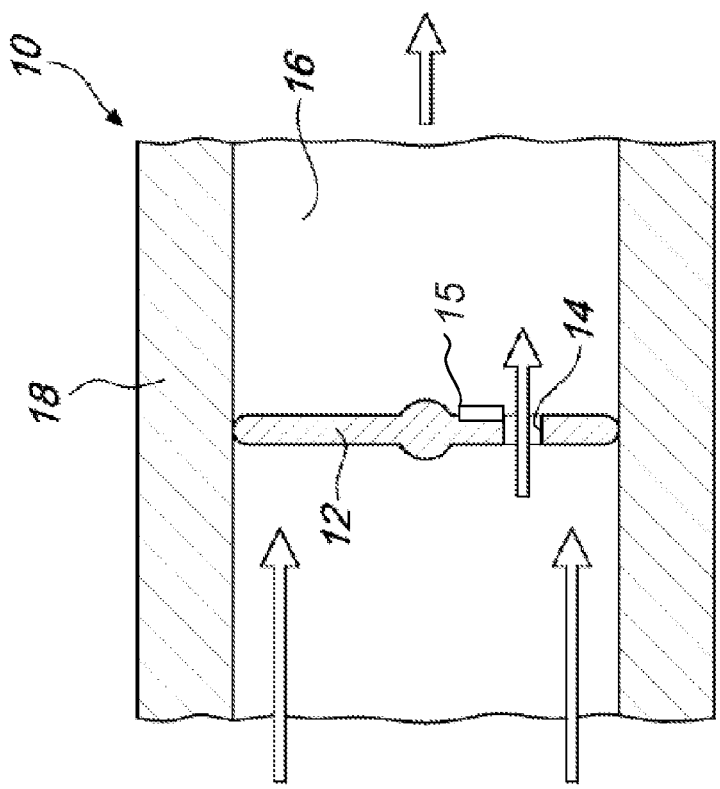
FIG. 2 is a schematic cross-section view of a first embodiment of the EGR apparatus having a flap-type valve member in a closed position and a bleeder in the valve member with arrows indicating flow of exhaust gas.
Figure 1:
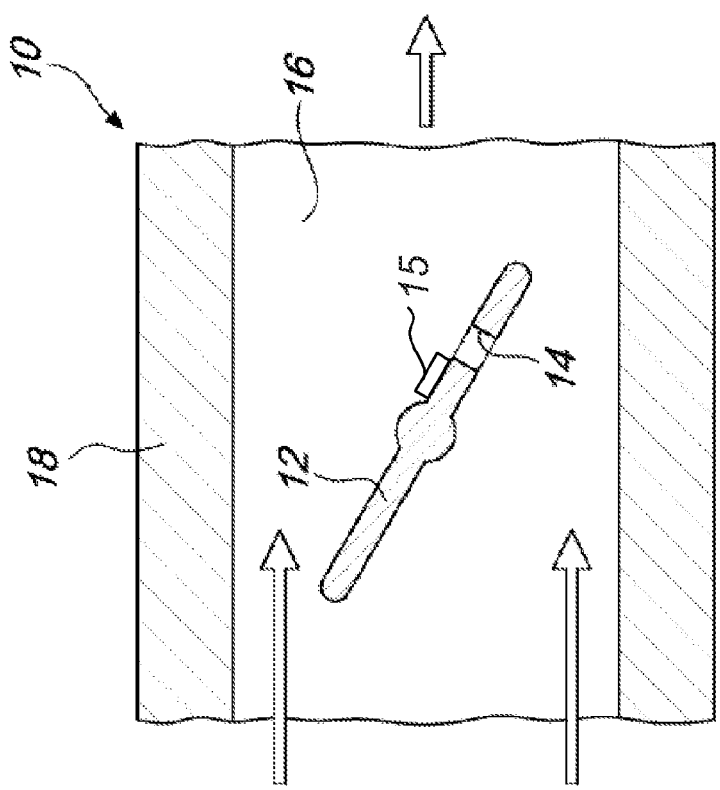
FIG. 1 is a schematic cross-section view of a first embodiment of an Exhaust Gas Recirculation (EGR) apparatus having a flap-type valve member in an open position and a bleeder in the valve member with arrows indicating flow of exhaust gas.

This disclosure generally relates to an Exhaust Gas Recirculation (EGR) apparatus 10 for regulating the flow of exhaust gas from an exhaust manifold to an inlet manifold of an internal combustion engine.

EGR apparatus 10 comprises a valve member 12 and one or more bleeders 14.

With reference to FIGS. 1-8, the EGR apparatus 10 may be positioned in an exhaust gas recirculation passage 16 which may branch from an exhaust gas passage that is in fluid communication with the combustion chambers of an internal combustion engine. The exhaust gas recirculation passage 16 may lead to an intake passage.

Valve member 12 may be a monolithic structure which does not permit flow of exhaust gas. The valve member 12 may be formed from a homogeneous material. In an embodiment, the valve member 12 may be fabricated from two or more individual parts assembled integrally to form a one-piece structure.

The valve member 12 may control the flow of exhaust gas through the exhaust gas recirculation passage 16. The valve member 12 may be selectively positionable in the exhaust gas recirculation passage 16 between an open position and a closed position. In the open position the valve member 12 may be positioned such that the exhaust gas recirculation passage 16 is unobstructed allowing passage of exhaust gas. In the closed position the valve member 12 may be positioned such that the exhaust gas recirculation passage 16 is obstructed preventing passage of exhaust gas.

With reference to first and third embodiments in FIGS. 1-2 and 5-6, respectively, the valve member 12 may be rotatable in the exhaust gas recirculation passage 16 between the open position and the closed position. With reference to second and fourth embodiments in FIGS. 3-4 and 7-8 respectively, the valve member 12 may be movable along a linear axis in the exhaust gas recirculation passage 16 between the open position and the closed position. Other forms of valve members 12 may be used in the EGR apparatus 10.

The valve member 12 may comprise a contact portion that is contoured for cooperation with passage wall 18 of the exhaust gas recirculation passage 16. In an embodiment, the contact portion of the valve member 12 may be contoured to allow contact between said contact portion and the passage wall 18 when the valve member 12 is in the closed position.

The EGR apparatus 10 may include a bleeder 14 to enable flow of exhaust gas through the exhaust gas recirculation passage 16 with the valve member 12 in the closed position. Bleeder 14 may have a suitable size for allowing a leakage of exhaust gas for recirculation to the intake manifold.

The amount of exhaust gas that flows from the engine cylinder may be dependent on the operation characteristics of the engine. The amount of exhaust gas produced in an engine may vary as a function of the operation power or operation load or operation rated speed.

In an embodiment, bleeder 14 may have a size which permits at least 5%-15% of exhaust gas produced at full engine operation power or operation load or operation rated speed in an engine cycle to flow through the exhaust gas recirculation passage 16 to the intake manifold, when the valve member 12 is in the closed position.

In an embodiment, bleeder 14 may have a size which permits at least 7%-12% of exhaust gas produced at full engine operation power or operation load or operation rated speed in an engine cycle to flow through the exhaust gas recirculation passage 16 to the intake manifold, when the valve member 12 is in the closed position.

In an embodiment, bleeder 14 may have a size which permits at least 10% of exhaust gas flow produced at full engine operation power or operation load or operation rated speed in an engine cycle to flow through the exhaust gas recirculation passage 16 to the intake manifold, when the valve member 12 is in the closed position.

In an embodiment, bleeder 14 may have a size which permits 15%, 12%, 11%, 10%, 9%, 7% or 5% of exhaust gas produced at full engine operation power or operation load or operation rated speed in an engine cycle to flow through the exhaust gas recirculation passage 16 to the intake manifold, when the valve member 12 is in the closed position.

The bleeder 14 may have a conformation suitable for flow of an amount of exhaust gas. In an embodiment, the bleeder 14 may be formed as a through passage for leakage of the exhaust gas through the exhaust gas recirculation passage 16 to the intake manifold.

The bleeder 14 may be located in a suitable position for flow of an amount of exhaust gas through the exhaust gas recirculation passage 16 when the valve member 12 is in the closed position.

Figure 6:
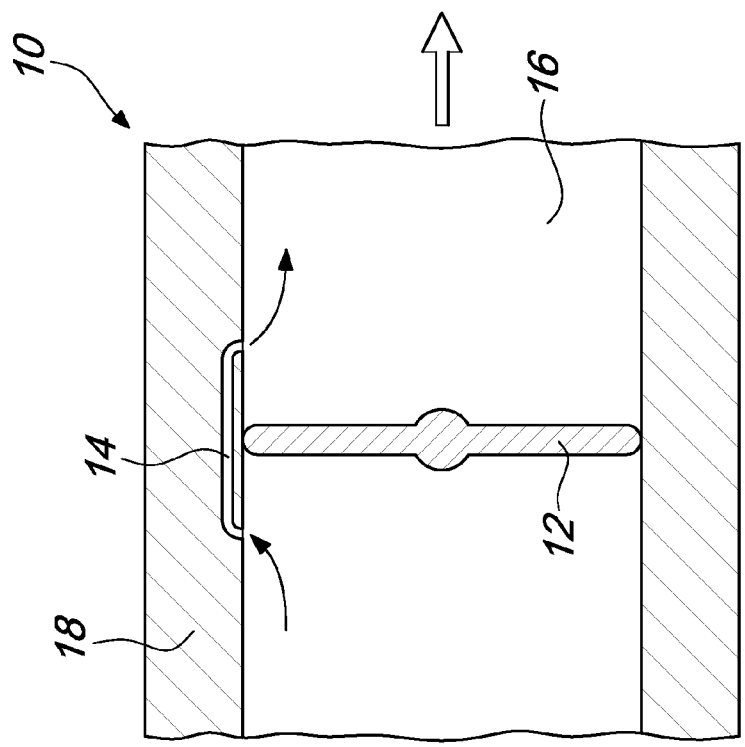
FIG. 6 is a schematic cross-section view of a third embodiment of the EGR apparatus having a valve member in a closed position and a bleeder in a wall of the EGR passage with arrows indicating flow of the exhaust gas with arrows indicating flow of the exhaust gas.
Figure 5:
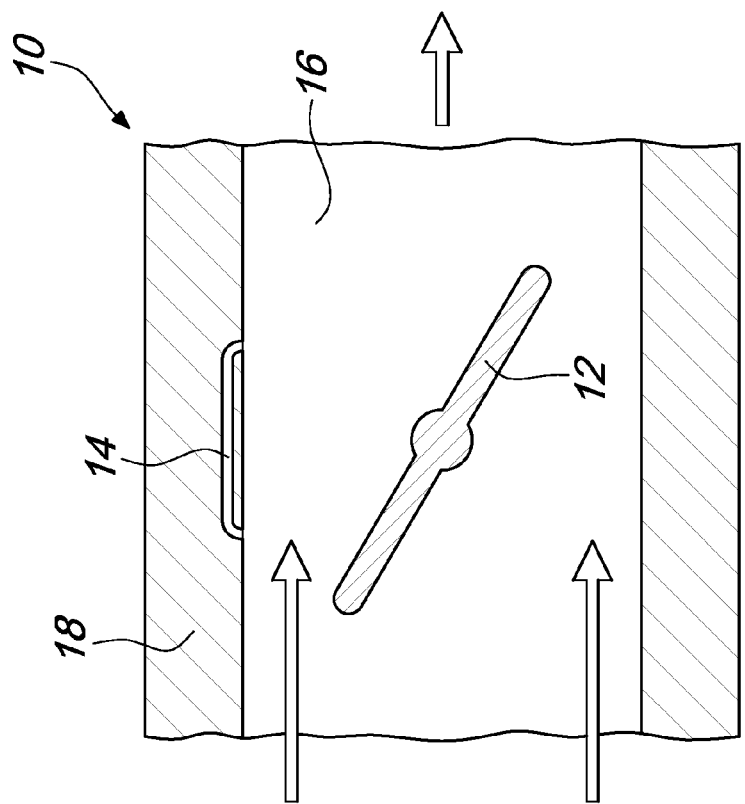
FIG. 5 is a schematic cross-section view of a third embodiment of the EGR apparatus having a valve member in an open position and a bleeder in a wall of the EGR passage with arrows indicating flow of the exhaust gas.

With reference to FIGS. 1-4, the bleeder 14 may be located in the valve member 12. With reference to FIGS. 5 and 6, the bleeder 14 may be located in the passage wall 18. In a further embodiment, the bleeder 14 may be formed partially in the passage wall 18 and the valve member 12 such that when the valve member 12 is in the closed position the bleeder 14 is located between the passage wall 18 and the valve member 12.

The EGR apparatus 10 may comprise two or more bleeders 14. The plurality of bleeders 14 may have a combined size that enables controlled leakage of exhaust gas produced at full engine operation power or operation load or operation rated speed in an engine cycle through the exhaust gas recirculation passage 16 to the intake manifold, when the valve member 12 is in the closed position.

The plurality of bleeders 14 may be located in the valve member 12 or in the passage wall 18. In an embodiment, the bleeders 14 may be located in the valve member 12 and the passage wall 18 and/or the bleeders 14 may be formed partially in the passage wall 18 and the valve member 12 such that when the valve member 12 is in the closed position the bleeders 14 are located between the passage wall 18 and the valve member 12.

Figure 9:
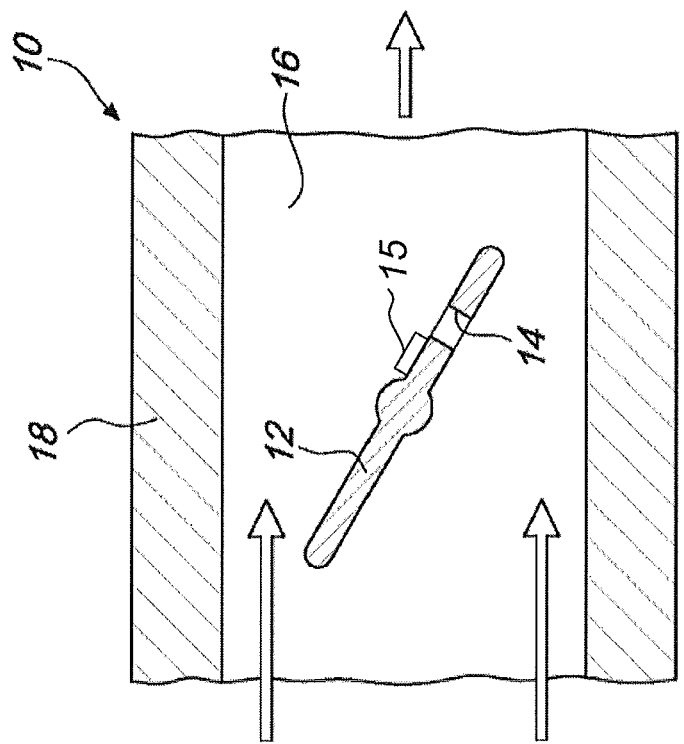
FIG. 9 is a schematic cross-section view of a first embodiment of an Exhaust Gas Recirculation (EGR) apparatus having a flap-type valve member in an open position and a bleeder with a bleeder valve in the valve member with arrows indicating flow of exhaust gas.
Figure 10:
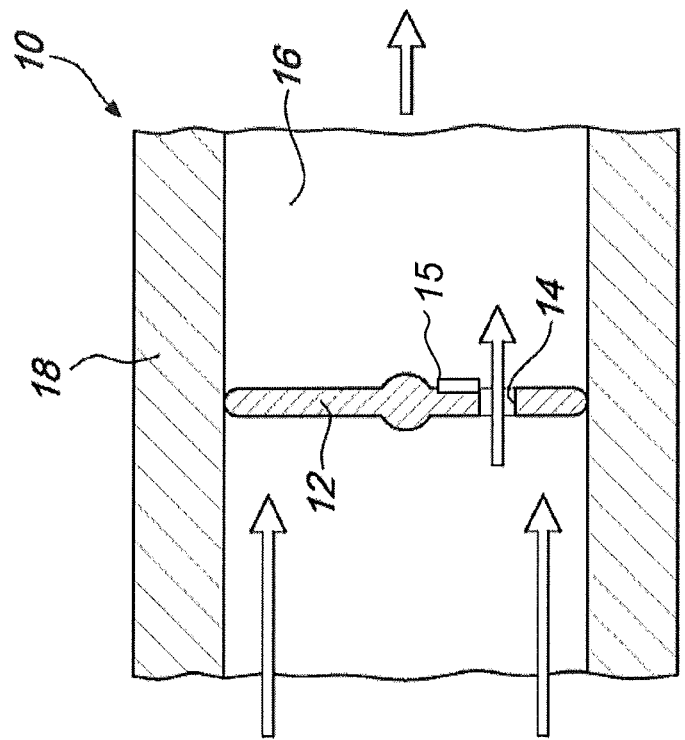
FIG. 10 is a schematic cross-section view of a first embodiment of the EGR apparatus having a flap-type valve member in a closed position and a bleeder with a bleeder valve in the valve member with arrows indicating flow of exhaust gas.

As shown in FIG. 9 and FIG. 10, the bleeder 14 may be provided with a bleeder valve to regulate the size or dimension thereof. With the bleeder valve, the amount of exhaust gas flowing from the inlet port to the outlet port may continue to be regulated at failure of the EGR apparatus 10. The bleeder valve may be provided within the inner margin of the bleeder 14. Suitable bleeder valves may be air operated pinch valves or reed valves. Control mechanisms for the variation of the bleeder valve may be provided. The control mechanisms may be mechanically or electronically controlled.

Figure 7:
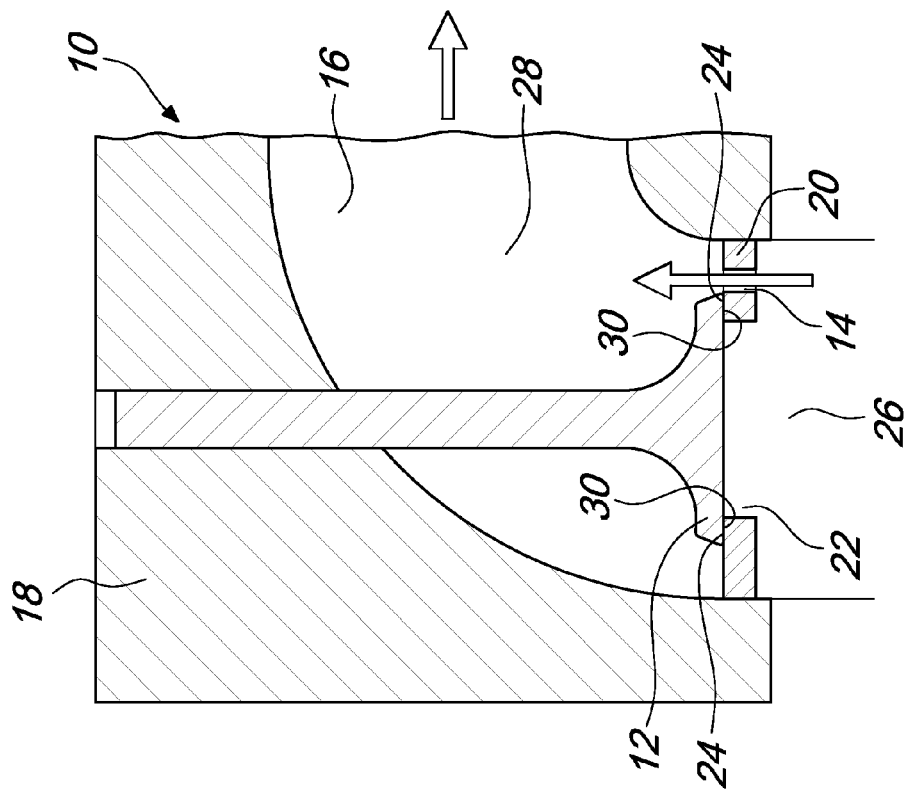
FIG. 7 is a schematic cross-section view of a fourth embodiment of the EGR apparatus having a valve member in an open position and a bleeder in a valve seat with arrows indicating flow of the exhaust gas.
Figure 8:
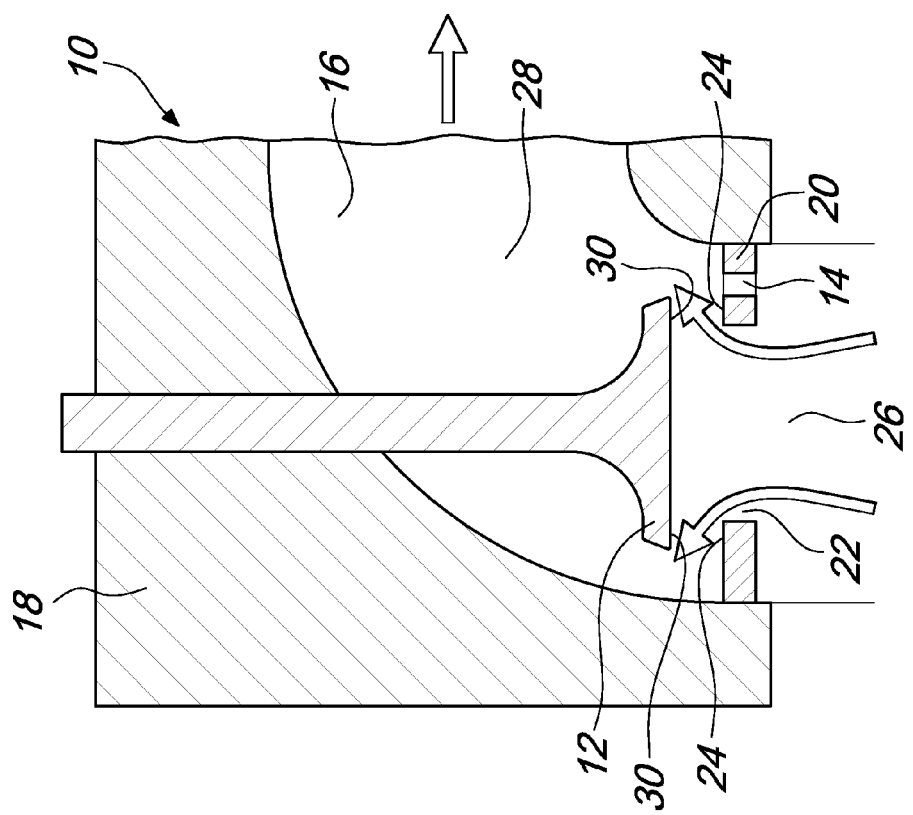
FIG. 8 is a schematic cross-section view of a fourth embodiment of the EGR apparatus having a valve member in a closed position and a bleeder in a valve seat with arrows indicating flow of the exhaust gas.

With reference to FIGS. 7 and 8, the EGR apparatus 10 may further comprise a valve seat 20. The valve seat 20 may be formed as a monolithic extension from the passage wall 18 of the exhaust gas recirculation passage 16 or may be fabricated separately and integrated to the passage wall 18.

Circumscribed at its inner margin, the valve seat 20 may comprise a valve-port 22 for flow of exhaust gas. Extending along the inner margin and around the valve-port 22 may be a valve seat surface 24 for engagement with the valve member 12. The valve seat 20 may be conformed to the shape of surrounding surface of the passage wall 18.

The exhaust gas recirculation passage 16 may be divided into an inlet port 26 and an outlet port 28 by the valve seat 20. Flow of exhaust gas between the inlet port 26 and the outlet port 28 may occur through the valve-port 22.

When the valve-port 22 is unobstructed, passage of exhaust gas from the inlet port 26 to the outlet port 28 may be permitted. When the valve-port 22 is sealed, passage of exhaust gas from the inlet port 26 to the outlet port 28 may be prevented.

The valve member 12 may cooperate with the valve seat 20 to control the flow of exhaust gas through the valve-port 22. The valve member 12 may be selectively positionable relative to the valve seat 20 between an open position and a closed position.

In the open position the valve member 12 may be positioned from the valve seat 20 such that the valve-port 22 is unobstructed. Passage of exhaust gas from the inlet port 26 to the outlet port 28 may be permitted through the unobstructed valve-port 22.

In the closed position the valve member 12 may be positioned to be in contact with the valve seat 20 such that the valve-port 22 is sealed. Passage of exhaust gas from the inlet port 26 to the outlet port 28 may be prevented through the sealed valve-port 22.

In an embodiment, the valve member 12 may be movable along a linear axis relative to the valve seat 20 between the open position and the closed position. In an alternative embodiment, the valve member 12 may be rotatable relative to the valve seat 20 between the open position and the closed position.

The valve member 12 may comprise a contact portion 30 that is shaped for cooperation with the valve seat 20. The contact portion 30 may have an outer perimeter that is shaped to complement the inner margin of the valve seat 20 so that peripheral contact is achieved between the contact portion 30 and the valve seat surface 24 when the valve member 12 is in the closed position.

In an embodiment, the contact portion 30 may have a frusto-conical tapered surface and the valve seat 20 may have a complementary frusto-conical tapered valve seat surface 24.

The EGR apparatus 10 may include bleeder 14 to enable flow of exhaust gas from the inlet port 26 to the outlet port 28 when the valve-port 22 is sealed by the valve member 12 in peripheral contact with the valve seat 20. Bleeder 14 may have a suitable size for allowing a leakage of engine exhaust gas for recirculation to the intake manifold.

With reference to FIGS. 7 and 8, the bleeder 14 may be located in the valve seat 20. In further embodiments, the bleeder 14 may be located between the valve seat 20 and the valve member 12 or between the valve seat 20 and the passage wall 18.

The EGR apparatus 10 may comprise a plurality of bleeders 14 located in the valve seat 20. In an embodiment, the bleeders 14 may be located in the valve seat 20 and in the valve member 12 and/or between the valve seat 20 and in the valve member 12. In a further embodiment, the bleeders 14 may be located in the valve seat 20 and in the passage wall 18 and/or between the valve seat 20 and the passage wall 18.

The EGR apparatus 10 may further comprise a valve body which may be positioned in the exhaust gas recirculation passage 16. The valve seat 20 may be provided in the valve body. In an embodiment, the valve body may include the inlet port 26 and the outlet port 28, both ports being separated by the valve-port 22 of the valve seat 20. The bleeder 14 may be located in the valve body. In an embodiment, a plurality of bleeders 14 may be located in the valve body.

The EGR apparatus 10 according to the present invention may comprise bleeders 14 located in and/or between any combination of the following: valve member 12, passage wall 18, valve seat 20 or valve body.

A method of assembling an EGR apparatus 10 may involve forming one or more bleeders 14 in the exhaust gas recirculation system of an engine to enable flow of exhaust gas through the EGR passage 16 when the valve member 12 is in the closed position.

A method of assembling the EGR apparatus 10 may involve initially determining the full operation capacity of the engine. The amount of exhaust gas produced at full engine operation power or operation load or operation rated speed in an engine cycle may be determined. The amount of exhaust gas which should continue to flow through the exhaust gas recirculation passage 16 to the intake manifold, when the valve member 12 is in the closed position, may be determined. The amount of exhaust gas may be at least 5%-15%, at least 7%-12% or at least 10%. The size of the bleeder or plurality of bleeders 14 which enable the required amount of exhaust gas flow may be determined.

Subsequent steps involve forming the one or more bleeders 14 that enable the required amount of exhaust gas leakage when the valve member 12 is in the closed position. The bleeder or plurality of bleeders 14 may be formed in and/or between any combination of the following: valve member 12, passage wall 18, valve seat 20 or valve body.

The skilled person would appreciate that foregoing embodiments may be modified to obtain the apparatus of the present disclosure.

Industrial Applicability

This disclosure describes an EGR apparatus 10 for recirculating exhaust gas from an exhaust manifold to an inlet manifold of an internal combustion engine.

The EGR apparatus 10 may be used in operation of combustion engines of vehicles such as diesel engine and petrol engine vehicles. The EGR apparatus 10 may permit limited engine exhaust gas recirculation during operation of the vehicle engine even when the valve member 12 is in the closed position. Continued flow of engine exhaust gas to the intake manifold, even in the failure of the valve member 12 in the closed position, may avoid related engine problems such as turbo overspeed, engine non-compliance and increase engine noise. Accordingly, engines with such failures of the EGR apparatus 10 do not have to be de-rated and serviced.

In operation, exhaust gas produced in the combustion cylinders of an internal combustion may be discharged into the exhaust manifold. A portion of the exhaust gas may be directed to the exhaust gas recirculation passage 16. In the open position of the valve member 12, the redirected exhaust gas flows through the EGR passage 16 to the intake manifold. In the closed position of the valve member 12, flow of the redirected exhaust gas through the EGR passage 16 is prevented by the valve member 12.

An amount of exhaust gas may flow through the bleeder or plurality of bleeders 14 onto the intake manifold. If a failure occurs when the valve member 12 is in the closed position, a leakage of the exhaust gas is facilitated by the bleeder or bleeders 14.

In an embodiment, the amount of engine exhaust gas being permitted to recirculate through the bleeder 14 may be controlled by a bleeder valve.

The industrial applicability of the EGR apparatus 10 as described herein will have been readily appreciated from the foregoing discussion.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

What is claimed is:

1. An Exhaust Gas Recirculation (EGR) apparatus for recirculating engine exhaust gas comprising:
    a valve member disposed in an exhaust gas recirculation passage of an engine, the valve member movable between an open position and a closed position to control the flow of the exhaust gas through the exhaust gas recirculation passage; and
    a bleeder that enables flow of exhaust gas through the exhaust gas recirculation passage when the valve member is in the closed position, the bleeder comprises a bleeder valve to regulate a size of the bleeder.

2. The EGR apparatus of claim 1 wherein the bleeder is a size that enables a flow of at least 5%-15% of exhaust gas produced at full engine operation power in an engine cycle.

3. The EGR apparatus of claim 2 wherein the bleeder is a size that enables a flow of at least 7%-12% of exhaust gas produced at full engine operation power in an engine cycle.

4. The EGR apparatus of claim 3 wherein the bleeder is located in the valve member.

5. A method of assembling the EGR apparatus, comprising the steps of:
    providing a valve member in an exhaust gas recirculation passage of an engine, the valve member movable between an open position and a closed position to control the flow of the exhaust gas through the exhaust gas recirculation passage; and
    forming a bleeder that enables flow of exhaust gas through the exhaust gas recirculation passage when the valve member is in the closed position, the bleeder comprises a bleeder valve to regulate a size of the bleeder.

6. A method of assembling the EGR apparatus of claim 5 further comprising the following step prior to the step of forming the bleeder:
    determining a size of the bleeder which enables a flow of at least 5%-15% of exhaust gas produced at full engine operation power in an engine cycle.

7. A method of assembling the EGR apparatus of claim 5 wherein the step of forming the bleeder involves forming the bleeder in the valve member.

8. An Exhaust Gas Recirculation (EGR) apparatus for recirculating engine exhaust gas comprising:
    a valve member disposed in an exhaust gas recirculation passage of an engine, the valve member movable between an open position and a closed position to control the flow of the exhaust gas through the exhaust gas recirculation passage; and
    a bleeder that enables flow of exhaust gas through the exhaust gas recirculation passage when the valve member is in the closed position,
    wherein the bleeder comprises a bleeder valve to regulate a size of the bleeder.

* * * * *